July 20, 1937.   H. S. SCOTT   2,087,415
AGITATING APPARATUS
Filed Aug. 16, 1935   2 Sheets-Sheet 2
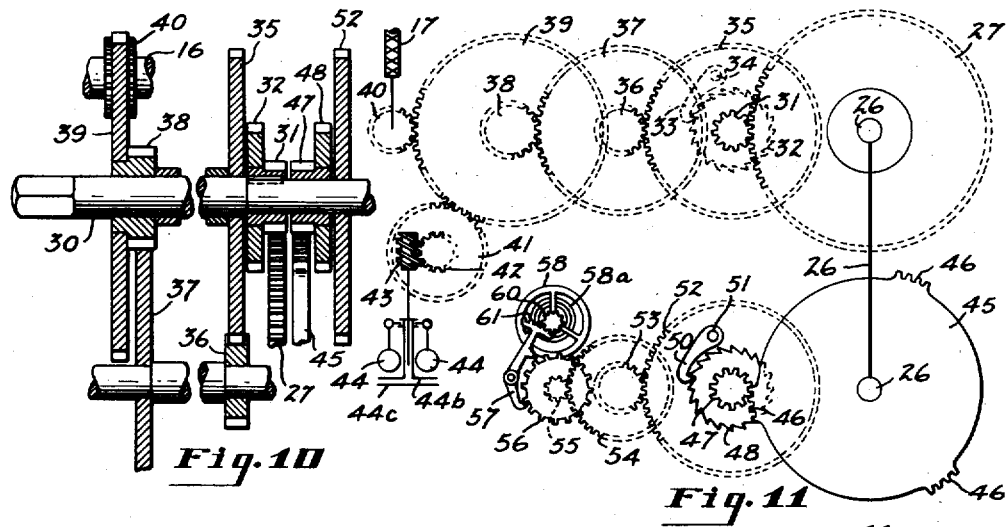
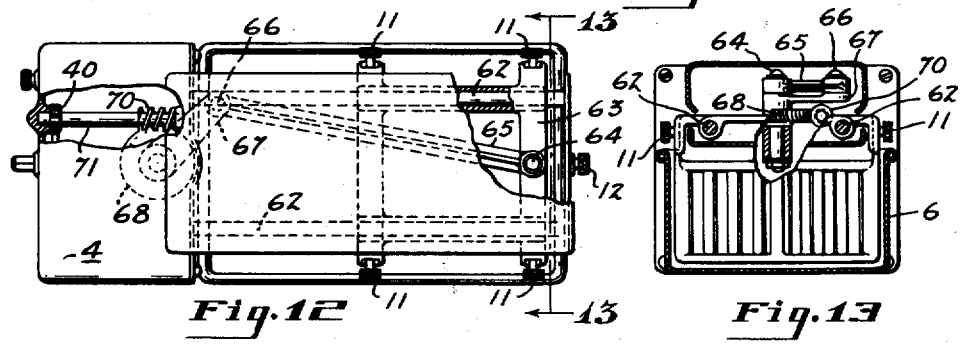
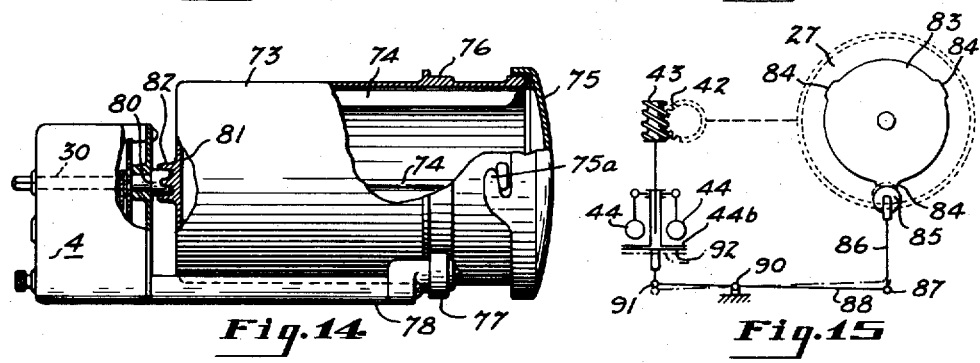
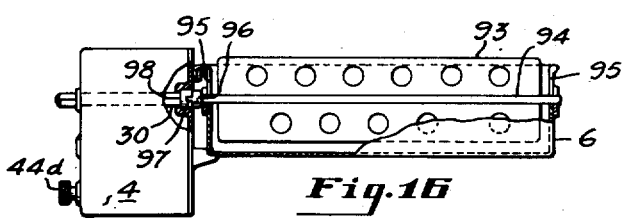
INVENTOR
Hoyt S. Scott
BY
ATTORNEY Patented July 20, 1937

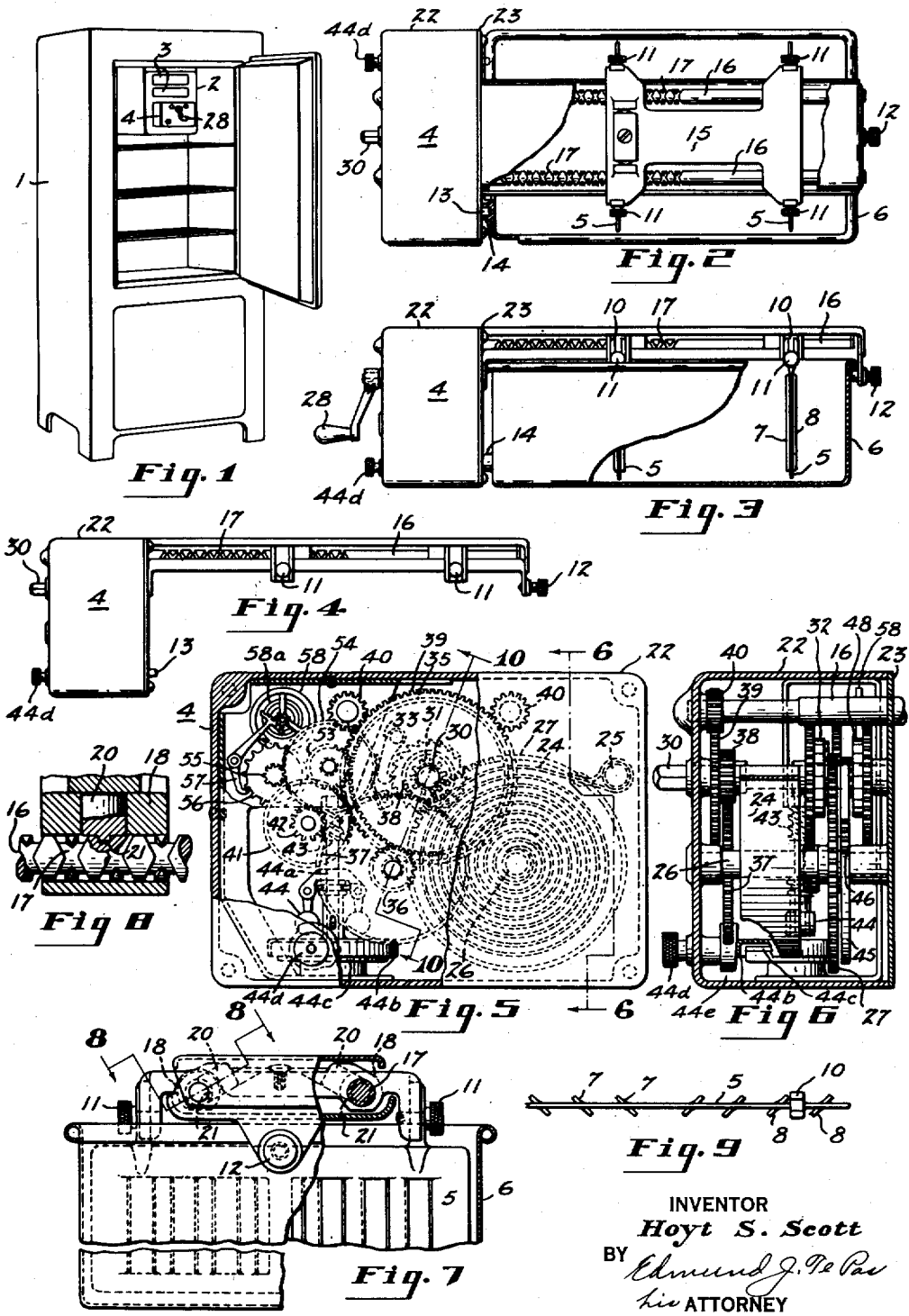

2,087,415

UNITED STATES PATENT OFFICE 2,087,415

AGITATING APPARATUS

Hoyt S. Scott, Ceveland, Ohio

Application August 16, 1935, Serial No. 36,485

8 Claims. (Cl. 259—113)

This invention relates to agitating devices and in particular devices of the sort which are adapted for use in connection with refrigerating apparatus for the making of ice cream and other frozen or congealed food products in which it is necessary or desirable to agitate or stir the product during the cooling period.

It is the object of this invention to provide a food agitating or stirring device adapted for use in connection with the freezing compartment of a refrigerator; which does not require the exercise of much skill in its use or care; which is substantially automatic in its operation; which does not introduce heat into the refrigerator during its operation; and which is of simple and inexpensive construction.

Stated in general terms, one form of the invention comprises a spring motor operated agitating or stirring device for agitating the contents of a receptacle, arranged so that when the spring of the motor is wound up and the device is started, it performs the stated operation on the receptacle contents which, for example, may comprise a quantity of an ice cream mix. Upon congealing, the resistance of the frozen ice cream automatically stops the operation of the spring motor. The agitation may be effected by means of stirrers engaging the contents of the container, or the container itself may be bodily moved to effect the agitation of the contents thereof. When stirrers are used, it is preferred to have the driving parts thereof arranged so that they do not extend through the containers below the liquid level of the container contents.

With these and other objects in view, the invention consists in the novel construction, arrangement and combination of parts, hereinafter illustrated and described in some of its embodiments in the accompanying drawings, and particularly pointed out in the appended claims.

In the drawings, Figure 1 is a perspective view of a refrigerator with the improved agitating or stirring device to which this invention particularly relates, in position in the freezing compartment of the refrigerator; Figure 2 is an enlarged plan view, with certain of the parts broken away, illustrating the details of the agitating device; Figure 3 is a side elevational view, with certain of the parts broken away, of the apparatus shown in Figure 2; Figure 4 is a side elevational view of the driving mechanism of the agitating device as it appears when separated from its stirring paddles and the food container; Figure 5 is an enlarged plan view, partly in section, illustrating the details of the spring motor used for driving the device; Figure 6 is a sectional view taken on line 6—6, Figure 5; Figure 7 is an enlarged end elevational view, partly in section, of the apparatus shown in Figures 2 and 3; Figure 8 is an enlarged detail sectional view taken on line 8—8, Figure 7; Figure 9 is a detail view taken at the top edge of a part of one of the stirring paddles; Figure 10 is an enlarged detail sectional view, taken on line 10—10, Figure 5, showing part of the gear train of the spring motor; Figure 11 is a diagrammatical view of the operating elements of the spring motor; Figure 12 is a plan view of a modified form of agitating apparatus; Figure 13 is a sectional view taken on line 13—13, Figure 12; Figure 14 is a side elevational view of another modification of the invention, in which the container itself is rotated to effect the agitation; Figure 15 is a diagrammatical view of a modified timer for the driving motor; and Figure 16 is another modification of the invention in which a rotatable agitator is employed.

The present invention is adapted for use in connection with refrigerators, such as shown in Figure 1 of the drawings, which comprises a cabinet 1 within which there is located a freezing compartment for the making of ice cubes and for other purposes requiring a temperature below that of the freezing point of water.

Refrigerators of the type shown, are ordinarily provided with a cooling unit in the form of an evaporator 2, defining a compartment for the reception of containers 3 for materials to be frozen, as for example, ice cube trays and deep containers which may be used in the preparation of chilled and congealed or frozen desserts and the like.

In the preparation of such desserts, as for example, ice cream, if the original liquid mix of the cream is not disturbed when it is freezing, the water content of such mix tends to separate out from the other ingredients in the form of rather large ice crystals, the presence of which is objectionable on both the grounds of taste and appearance of the product. In order to overcome these objections and to prevent the separation of the ingredients of the mix, it is proposed by this invention to provide a mechanically-operated device for agitating or stirring the mix comprising a spring motor 4, which provides power for the operation of one or more stirring paddles 5, located in a container 6 for the material to be agitated.

The paddles 5 may be in the form of a generally flat plate, portions of which are slitted and then bent at an angle to the plane of the plate to define a number of slots or apertures and to form series of blades 7 and 8, one of which blades is adjacent to each of the said slots. The blades 7 may be inclined in one direction and the blades 8 inclined in an opposite direction. The openings through the plate and the angular disposition of the blades insures the thorough mixing of the contents of the container when the paddles are operated.

Forked or channeled elements 10 are provided at the upper edge of the stirring paddles 5 for engagement with thumb screws 11, threadably received in another part of the device by means of which the paddles may be associated in a readily detachable manner with the mechanism provided for their operation. The operating mechanism of the device is secured at one end to the container 6 by means of a thumb screw 12 which is carried by the mechanism and engages with the rear upper edge of the container 6. At its other end the mechanism is provided with a tongue 13 which engages with, or is received in a groove 14 at the forward end of the container. The mechanism is readily removed from the container by simply loosening the thumb screw 12, whereupon this end of the mechanism may be raised above the top edge of the container, and upon its being shifted forwardly a slight amount, it may then be removed as a unit from the container.

The stirring paddles 5 are carried by a supporting member 15 in the form of a cross-head, mounted for reciprocation upon a pair of rotatable rods 16, having right and left-handed helical grooves 17, which need not extend over more than approximately one-half of the length of the rods 16. Spaced bearing members 18, carried by the cross-head 15, are each provided with a suitable bearing aperture for receiving one of the shafts 16. Within each of the bearing members 18 there is located a plug 20 having a tongue 21 of reduced size which projects from the bearing aperture into the helical grooves 17 of the shaft 16.

Upon rotation of the shaft 16 the groove engaging parts 21 of the plug 20 cause the cross-head 15 and associated paddles 5 to move toward one end or the other of the container 6, and when the part 21 reaches the end of the grooved portion of the shaft, it then follows the path of the oppositely cut groove, and in this way, the cross-head 15 and paddles 5 are reciprocated back and forth in the container 6. A shallow, dished plate 21 is provided just below the shaft 16 to prevent the material in the container 6 from coming in contact with the shafts or rods 16 and also to prevent lubricant on the rods 16 from dripping into the container 6.

The spring motor 4 which is provided for rotating the rods 16, is located within a hollow casing 22, having a cover plate 23 at its rear side, located adjacent to the container 6 when the device is in its operative position. The motor comprises a single clock spring 24, connected at one end to a pin 25 rigid with the casing 22, and at its other end the spring is secured to a shaft 26 journaled for rotation in the casing 22. A gear 27 is fixed to the shaft 26 for rotation therewith.

Winding of the spring is effected by means of a crank 28 on a shaft 30, having fixed thereon a pinion 31 that meshes with the teeth of the gear 27. The shaft 30 is also provided with a ratchet gear 32 fixed thereto, cooperating with a pawl 33 pivoted at 34 to a gear 35, which is rotatably mounted on the shaft 30. The ratchet gear and its pawl permit winding of the spring without effecting rotation of the gear 35. After the spring has been wound up, the tension of the spring then is available for driving the gear 34 through the pinion 31, the ratchet gear 32 and the pawl 33. The gear 35 in turn serves to drive a pinion 36, a gear 37 coaxial therewith, a pinion 38, a gear 39 coaxial with such pinion, and a pair of gears 40, one of which is fixed for rotation with each of the shafts 16, and in this manner, the energy of the spring is utilized in reciprocating the paddles for stirring the contents of the container 6.

The speed at which the paddles are driven is automatically controlled by means of a centrifugally operable friction governor which is geared to the gear 39 of the driving mechanism by means of worm gears 41, 42 and 43. The governor comprises a pair of radially movable, pivotally hung, centrifugal weights 44, carried and driven by a shaft 44ª fixed to the worm gear 43. A brake drive or disk 44ᵇ is keyed to the shaft 44ª and slidable therealong in response to the radial movement of the weights 44. A brake pad 44ᶜ, fixed to the casing 22, provides a cooperating braking surface against which the drum 44ᵇ is moved as the weights 44 swing outwardly under the influence of centrifugal force as the shaft 44ª is rotated. Operation of the motor may be manually controlled by means of a member 44ᵈ provided for moving a cam 44ᵉ into and out of stopping engagement with the drum 44ᵇ.

A mutilated gear 45, having groups of teeth 46, arranged at regular intervals about its peripheral edge, is mounted on the shaft 26 coaxially with the gear 27 and fixed for rotation therewith. The toothed portions 46 of the mutilated gear 45 are adapted for meshing engagement with a gear 47, fixed to a ratchet gear 48, which cooperates with a pawl 50 pivotally attached at 51 to a gear 52 in much the same manner as for the pawl 33 with respect to the gear 35, so that during the winding of the spring 24, the gears 45, 47 and 48 may be rotated in a clockwise direction without effecting rotation of the gear 52 which is rotatably mounted on the shaft 30.

The gear 52 meshes with a pinion 53, fixed to a gear 54 which in turn meshes with the pinion 55 fixed to an escapement wheel 56, the teeth of which are engaged by the arms of an escapement lever 57. The oscillations of the lever 57 are controlled by a balance wheel 58 and an associated hair spring 58ª which are operatively connected to the lever by means of a pinion 60 on the wheel and a gear segment 61 on the lever.

The motor just described, is adapted to drive the paddles for an extended period of time due to the fact that the paddles are not continuously reciprocated as their movement is substantially stopped when the spring of the motor drives the timing mechanism which occurs at such times when the gear teeth 46 mesh with the pinion 47. In the arrangement shown, it is contemplated to drive the paddles or stirrers for twenty seconds every ten minutes over a period of two hours. These times or periods are not necessarily critical and may be varied as desired by making changes in the motor gearing and spring which would be understood by anyone skilled in the art of making spring motors. It has been found in practice that the stated mode of operation will prevent the formation of undesirable ice crystals in frozen or congealed foods. The relatively short total time of agitation conserves the energy of the motor and permits the use of a relatively small motor for the stated purpose.

When the material in the container 6 has congealed sufficiently, the resistance offered by such material will be great enough to stop further movement of the paddles. By stirring the materials intermittently, somewhat quicker freezing is effected, for substantially very little heat is generated in the material through the stirring operation.

The use of a spring motor is important in a device of this sort because a motor of this type, in its operation, has no tendency to raise the temperature in the refrigerator as would occur in the case of an electric motor for example, and after having once wound the spring, the device requires no further attention on the part of the user and the entire apparatus may be left in the refrigerator without attention until the time when it is intended to use the food within the container 6, at which time the container 6 and associated agitator are removed from the freezing compartment 2, and the thumb screws 11 and 12 are then loosened, whereupon the driving mechanism of the paddles may be removed from the container with the paddles in place therein. After this has been done, the paddles then may be removed separately from the container and its contents.

Figures 12 and 13 illustrate a modified form of reciprocating drive for the paddles associated with substantially the same driving motor and gearing as that just described. This form of the invention differs from the apparatus previously described in that the grooved shafts 16 are replaced by a pair of fixed shafts 62 which serve as guides for a cross-head 63, mounted for reciprocation on such shafts. The cross-head is pivotally connected at 64 to one end of a pitman or connecting rod 65, the other end of which is pivoted at 66 to a crank 67, mounted for rotation with a worm gear 68 driven by a worm 70. The shaft 71 of the worm 70 is fixed to rotate with one of the gears 40 previously described, and in this manner, the stirring paddles are reciprocated back and forth in the container 6, the same being removably secured to the cross-head 63 by means of a thumb screw 11. The mechanism may also be removed from the container 6 upon the loosening of a thumb screw 12, as in the case of the device previously described.

Figure 14 illustrates another modification of my invention, in which the same driving motor is utilized for bodily rotating a freezing container 73, provided at its inside with inwardly extending baffles 74 which serve to stir the contents of the container when rotated. A removable cap 75, having a locking device 75ª, is provided for the open end of the container and intermediate its length the container is provided with an annular flanged track 76 which rides upon a pair of rollers 77 journaled on extending arms 78 rigid with the housing of the spring motor. One of these arms extends from each of the lower opposite edges or corners of the motor housing.

The driving shaft 30 of the spring motor is provided at one end with an enlargement 80, which is grooved as at 81, to effect detachable driving connection with a hub or socket portion 82 of complementary form provided on the adjacent end of the container 73.

When the spring motor is operating it serves to rotate the container very slowly for a time and then at stated intervals it rotates the container more rapidly for a shorter period of time. More rapid rotation of the container could be effected by connecting it to the shaft 70 of the driving mechanism shown in Figure 12 in which the container would be rotated at the same speed as that for the gear 40.

Figure 15 illustrates a modification of an intermittently operable retarding device which may be used in connection with the driving motor previously described. This device is intended to supplant the timing mechanism shown in the lower portion of diagrammatical illustration, Figure 15. In place of the mutilated gear 45, a disk 83 having spaced cam faces 84 is secured to the gear 27 for rotation therewith. A roller 85 rotatably carried on an arm 86, pivoted at 87 to a fulcrum lever 88, engages the periphery of the disk 83. The fulcrum lever 88 is pivoted at 90 with respect to the casing of the motor, and at its end 91 remote from the connection 87, it is pivotally connected to a brake pad 92 similar to the pad 44ᶜ previously described and differing therefrom only in that it is mounted for movement toward and away from the brake disk 44ᵇ of the governor.

In the arrangement just described, when the cam faces 84 engage with the roller 86, the brake pad 92 is moved closer to the brake disk 44ᵇ of the governor, and in this manner, the operation of the motor is slowed down at stated intervals in much the same manner as was accomplished by means of the clockwork mechanism previously described. This arrangement has certain advantages as regards cost and simplicity, and it may be used where extremely accurate timing of the mechanism is not absolutely necessary.

Figure 16 illustrates another modification of the invention in which the reciprocating paddles are replaced by a rotatable paddle 93 having a shaft 94, the ends of which are rotatably received in suitable slots 95 formed in the ends of the container 6. A detachable driving connection comprising a head 96 fixed to the shaft 94, having a tongue 97 received in a slot of complementary form, formed in a driving head 98 which is carried by the driving shaft 30, is provided between the motor and the paddle. The paddle is driven in much the same manner as for the container 73 previously described. The driving shaft of the paddle may be fixed for rotation with one of the driving gears 40 as was suggested in the case of the device shown in Figure 14. The modification illustrated in Figure 16 is somewhat simpler than the arrangements shown in some of the forms of the invention earlier described.

The provision of a driving device employing a single spring is of considerable importance from the standpoint of cost. It is, of course, understood that separate driving springs and gear trains might be used in place of the arrangement shown, and the mechanism used in an ordinary alarm clock might be adapted without difficulty to this purpose, in which case, the spring provided for driving the alarm would be used to drive the stirrer or container, and the alarm controlling device which is driven by the clockwork would be arranged to start and stop the agitation at stated intervals, in much the same manner as in the case of the devices described.

The word "intermittently" as used herein in connection with the operation of the agitator, is intended to describe the situation where the agitation is effected successively at different rates or intensities, as well as the case where the agitation is successively effected for periods of time between which the agitation is substantially or completely stopped.

Furthermore, it is to be understood that the particular forms of apparatus shown and described, and the particular procedure set forth are presented for purposes of illustration and explanation and that various modifications of said apparatus and procedure may be made without departure from the invention as defined in the appended claims.

Having thus described my invention what I claim is:

1. Refrigerating apparatus comprising a cabinet, a freezing unit therein having a compartment for reception of a container for materials to be frozen, and self-contained, manually-energized means carried by said container for intermittently agitating the contents thereof, said means comprising a spring motor and control devices actuated by said motor for intermittently changing the speed of operation of the motor.

2. Refrigerating apparatus comprising a cabinet, a freezing unit therein having a compartment for reception of a container for materials to be frozen, and self-contained, manually-operated means removably associated with said container for intermittently agitating the contents thereof, said means comprising a spring motor and control devices actuated by said motor for intermittently changing the speed of operation of the motor.

3. Refrigerating apparatus comprising a cabinet, a freezing unit therein having a compartment for reception of a container for materials to be frozen, and self-contained, manually-operated means for intermittently agitating the contents of said container during predetermined successive time intervals during the freezing period only, said means comprising a spring motor and control devices actuated by said motor for intermittently changing the speed of operation of the motor.

4. An agitating device comprising a container for materials to be agitated, and means for agitating the contents of said container intermittently, said means comprising a motor having manually operable means for the energization thereof and control devices actuated by said motor for intermittently changing the speed of operation thereof.

5. An agitating device comprising a container for materials to be agitated, and means for intermittently agitating the contents of said container, said means comprising a motor removably associated with said container having manually operable means for its energization, and control devices actuated by said motor for intermittently changing the speed of operation thereof.

6. An agitating device comprising a container for materials to be agitated, and means for agitating the contents of said container comprising a manually wound spring motor carried by said container, said motor having a single driving spring and means associated therewith for intermittently retarding the speed of operation of the motor.

7. An agitating device comprising a container for materials to be agitated, and means for agitating such materials comprising a spring motor and a timing device driven by said motor for intermittently changing the speed of operation of the motor.

8. An agitating device comprising a container for materials to be agitated, and means for agitating such materials comprising a spring motor and a speed-responsive governor and a timing device driven by said motor for alternately controlling the speed of operation of the motor.

HOYT S. SCOTT.

---

CERTIFICATE OF CORRECTION.

Patent No. 2,087,415.　　　　　　　　　　　　　　　　July 20, 1937.

HOYT S. SCOTT.

It is hereby certified that error appears in the printed specification of the above numbered patent requiring correction as follows Page 2, second column, line 4, for the word "found" read wound; page 4, first column, lines 25 and 35, claims 2 and 3 respectively, for "manually-operated" read manually-energized; and second column, line 16, claim 5, strike out the comma after "energization"; and that the said Letters Patent should be read with these corrections therein that the same may conform to the record of the case in the Patent Office.

Signed and sealed this 31st day of August A. D. 1937.

Leslie Frazer (Seal)　　　　　　　　　　　　　　　　　　Acting Commissioner of Patents.

between which the agitation is substantially or completely stopped.

Furthermore, it is to be understood that the particular forms of apparatus shown and described, and the particular procedure set forth are presented for purposes of illustration and explanation and that various modifications of said apparatus and procedure may be made without departure from the invention as defined in the appended claims.

Having thus described my invention what I claim is:

1. Refrigerating apparatus comprising a cabinet, a freezing unit therein having a compartment for reception of a container for materials to be frozen, and self-contained, manually-energized means carried by said container for intermittently agitating the contents thereof, said means comprising a spring motor and control devices actuated by said motor for intermittently changing the speed of operation of the motor.

2. Refrigerating apparatus comprising a cabinet, a freezing unit therein having a compartment for reception of a container for materials to be frozen, and self-contained, manually-operated means removably associated with said container for intermittently agitating the contents thereof, said means comprising a spring motor and control devices actuated by said motor for intermittently changing the speed of operation of the motor.

3. Refrigerating apparatus comprising a cabinet, a freezing unit therein having a compartment for reception of a container for materials to be frozen, and self-contained, manually-operated means for intermittently agitating the contents of said container during predetermined successive time intervals during the freezing period only, said means comprising a spring motor and control devices actuated by said motor for intermittently changing the speed of operation of the motor.

4. An agitating device comprising a container for materials to be agitated, and means for agitating the contents of said container intermittently, said means comprising a motor having manually operable means for the energization thereof and control devices actuated by said motor for intermittently changing the speed of operation thereof.

5. An agitating device comprising a container for materials to be agitated, and means for intermittently agitating the contents of said container, said means comprising a motor removably associated with said container having manually operable means for its energization, and control devices actuated by said motor for intermittently changing the speed of operation thereof.

6. An agitating device comprising a container for materials to be agitated, and means for agitating the contents of said container comprising a manually wound spring motor carried by said container, said motor having a single driving spring and means associated therewith for intermittently retarding the speed of operation of the motor.

7. An agitating device comprising a container for materials to be agitated, and means for agitating such materials comprising a spring motor and a timing device driven by said motor for intermittently changing the speed of operation of the motor.

8. An agitating device comprising a container for materials to be agitated, and means for agitating such materials comprising a spring motor and a speed-responsive governor and a timing device driven by said motor for alternately controlling the speed of operation of the motor.

HOYT S. SCOTT.

---

CERTIFICATE OF CORRECTION.

Patent No. 2,087,415.   July 20, 1937.

HOYT S. SCOTT.

It is hereby certified that error appears in the printed specification of the above numbered patent requiring correction as follows Page 2, second column, line 4, for the word "found" read wound; page 4, first column, lines 25 and 35, claims 2 and 3 respectively, for "manually-operated" read manually-energized; and second column, line 16, claim 5, strike out the comma after "energization"; and that the said Letters Patent should be read with these corrections therein that the same may conform to the record of the case in the Patent Office.

Signed and sealed this 31st day of August A. D. 1937.

Leslie Frazer (Seal)   Acting Commissioner of Patents.

CERTIFICATE OF CORRECTION.

Patent No. 2,087,415.　　　　　　　　　　　　　　　　　　　July 20, 1937.

HOYT S. SCOTT.

It is hereby certified that error appears in the printed specification of the above numbered patent requiring correction as follows Page 2, second column, line 4, for the word "found" read wound; page 4, first column, lines 25 and 35, claims 2 and 3 respectively, for "manually-operated" read manually-energized; and second column, line 16, claim 5, strik out the comma after "energization"; and that the said Letters Patent should be read with these corrections therein that the same may conform to the record of the case in the Patent Office.

Sigred and sealed this 31st day of August A. D. 1937.

Leslie Frazer (Seal)　　　　　　　　　　　　　　　　　　Acting Commissioner of Patents.